United States Patent
Tran et al.

(10) Patent No.: US 9,596,613 B2
(45) Date of Patent: Mar. 14, 2017

(54) METHOD OF ESTABLISHING SMART ARCHITECTURE CELL MESH (SACM) NETWORK

(71) Applicant: Wistron NeWeb Corporation, Hsinchu (TW)

(72) Inventors: Jimmy Cuong Tran, Hsinchu (TW); Geoff Sarney, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 609 days.

(21) Appl. No.: 14/019,561

(22) Filed: Sep. 6, 2013

(65) Prior Publication Data

US 2014/0355420 A1  Dec. 4, 2014

Related U.S. Application Data

(60) Provisional application No. 61/828,695, filed on May 30, 2013.

(51) Int. Cl.
*H04W 24/02* (2009.01)
*H04W 84/18* (2009.01)
(Continued)

(52) U.S. Cl.
CPC ........... *H04W 24/02* (2013.01); *H04L 12/462* (2013.01); *H04W 40/34* (2013.01); *H04W 84/18* (2013.01);
(Continued)

(58) Field of Classification Search
CPC ..... H04W 24/02; H04W 84/18; H04W 88/08; H04W 88/16
(Continued)

(56) References Cited

U.S. PATENT DOCUMENTS 6,965,575 B2 * 11/2005 Srikrishna ............... H04L 45/00
370/238
7,835,301 B1 * 11/2010 Maufer ................. H04W 24/02
370/254

(Continued)

FOREIGN PATENT DOCUMENTS

WO  2008109392 A1  9/2008
WO  2011078646 A1  6/2011

OTHER PUBLICATIONS

Santhi Kumaran et al., "Hybrid Wireless Mesh Network for Universal Access: Opportunities and Challenges", 2010 Sixth Advanced International Conference on Telecommunications, May 9, 2010, pp. 390-397, XP031693092, IEEE, USA.

*Primary Examiner* — Ricky Ngo
*Assistant Examiner* — Dewanda Samuel
(74) *Attorney, Agent, or Firm* — Winston Hsu; Scott Margo

(57) ABSTRACT

The present disclosure provides a method of establishing a SACM network is disclosed. The method comprises deploying a plurality of mesh nodes, wherein each of mesh nodes having a mesh node capability to communicate with the other mesh nodes as well as a gateway capability to provide an access to a service network, wherein the service network provides a wireless communication service; establishing a plurality of links between the mesh nodes, each of the links connecting two of the mesh nodes; searching and selecting a plurality of dynamic gateway nodes from the plurality of the mesh nodes and establishing a plurality of connections between the dynamic gateway nodes and the service network and performing routing and path optimizing to find optimal route paths for all the mesh nodes to access the service network.

36 Claims, 10 Drawing Sheets

(51) Int. Cl.
  *H04W 40/34* (2009.01)
  *H04L 12/46* (2006.01)
  *H04W 40/12* (2009.01)
  *H04L 12/721* (2013.01)
  *H04L 12/707* (2013.01)
  *H04L 12/703* (2013.01)
(52) U.S. Cl.
  CPC .............. *H04L 45/12* (2013.01); *H04L 45/22* (2013.01); *H04L 45/28* (2013.01); *H04W 40/12* (2013.01)
(58) Field of Classification Search
  USPC ........ 370/328, 338, 395.5, 395.32, 401, 406
  See application file for complete search history.
(56) References Cited

U.S. PATENT DOCUMENTS

| | | | |
|---|---|---|---|
| 8,248,949 B2* | 8/2012 | Ozer | H04W 84/22 370/237 |
| 8,385,550 B2* | 2/2013 | Sun | H04L 63/0428 380/270 |
| 8,848,558 B1* | 9/2014 | Martin | H04L 41/12 370/252 |
| 9,173,111 B2* | 10/2015 | Pace | H04W 40/00 |
| 2005/0074019 A1* | 4/2005 | Handforth | H04L 12/44 370/406 |
| 2005/0135268 A1* | 6/2005 | Simon | H04L 63/064 370/254 |
| 2005/0232179 A1* | 10/2005 | daCosta | H04W 84/00 370/315 |
| 2006/0245442 A1* | 11/2006 | Srikrishna | H04W 40/248 370/406 |
| 2008/0112355 A1 | 5/2008 | Krishnakumar | |
| 2008/0175257 A1 | 7/2008 | Winter | |
| 2009/0154343 A1 | 6/2009 | Fitch | |

* cited by examiner

METHOD OF ESTABLISHING SMART ARCHITECTURE CELL MESH (SACM) NETWORK

CROSS REFERENCE TO RELATED APPLICATIONS

This application claims the benefit of U.S. Provisional Application No. 61/828,695 filed on May 30, 2013 and entitled "Method to deploy Smart Architecture Cellular Mesh (SACM) for Smart Metering/Smart Grid and M2M Application", the contents of which are incorporated herein.

BACKGROUND OF THE INVENTION

1. Field of the Invention

The present invention relates to a method of establishing a mesh network, and more particularly, to a method of establishing a smart architecture cell mesh network for Machine-to-Machine communication.

2. Description of the Prior Art

Machine-type communication (MTC), also referred to as "Machine-to-Machine" or "M2M", is one type of data communication including one or more entities not requiring human interactions. That is, the MTC refers to the concept of communication based on a network such as the existing GERAN, UMTS, long-term evolution (LTE), or the like used by a machine device instead of a mobile station (MS) used by a user. The machine device used in the MTC can be called an MTC device. There are various MTC devices such as a vending machine, a machine of measuring a water level at a dam, etc. That is, the MTC is widely applicable in various fields. The MTC device has features different from that of a typical MS. Therefore, a service optimized to the MTC may differ from a service optimized to human-to-human communication. In comparison with a current mobile network communication service, the MTC can be characterized as a different market scenario, data communication, less costs and efforts, a potentially great number of MSs for communication, wide service areas, low traffic per MS, etc.

Smart metering has been on the deployment road map for the last two decades, waiting for technology and innovation to drive down implementation costs to an extent whereby payback was achieved. Realistically that fulcrum of innovation over cost is still not achieved to date.

Some pure play Mesh networks (Mesh v1.0) have been proposed and deployed in the Smart Metering market, such as the SecureMesh network from Trilliant, and the Utility IQ Silver Spring Network. Both Mesh networks, propose to have many simple mesh nodes that do not have WAN connectivity capability. All Mesh nodes are to be communicated back to the software head end through an established PSTN (normally a cable/fiber infrastructure) "gateway" concentrator node. It collects all the communication from all the nodes, and then transports them back to the server.

This, in theory, presents a low cost solution to deploy Smart Metering by having each expensive Gateway Concentrator to support 1000 to 2000 lower cost Mesh nodes. However, it proves to be wrong in many real life environments. The typical mesh nodes per gateway may be in the range of 20 to 50 nodes in a practical deployment. Therefore, the economical proposal of the solution has been invalidated. On top of that, a deployment of several hundred thousand gateway concentrators requires careful site survey and significant deployment planning. This will add a huge hidden extra cost into a large-scale deployment of this kind of Mesh network. The single largest concern when deploying large-scale infrastructure across distributed geographies/customer is that of "ease of implementation". The costs of missed visits, coupled with incorrect siting of concentrators, all increases the risk as well as the solution costs.

Another significant drawback to this network type, is the associated liability of a large-scale mesh concentrator "brown out" and its knock on effect to the sub-servant mesh nodes. Typically to overcome this potential failing one would engineer additional capacity for concentrator backhaul—thus increasing the overall deployment costs further.

SUMMARY OF THE INVENTION

It is therefore a primary objective of the present disclosure to provide method of establishing a smart cell architecture mesh (SACM) network.

A method of establishing a SACM network is disclosed. The method comprises deploying a plurality of mesh nodes, wherein each of mesh nodes having a mesh node capability to communicate with the other mesh nodes as well as a gateway capability to provide an access to a service network, wherein the service network provides a wireless communication service; establishing a plurality of links between the mesh nodes, each of the links connecting two of the mesh nodes; searching and selecting a plurality of dynamic gateway nodes from the plurality of the mesh nodes and establishing a plurality of connections between the dynamic gateway nodes and the service network; and performing routing and path optimizing to find optimal route paths for all the mesh nodes to access the service network.

A method of joining/re-joining a first micro-mesh for a mesh node is disclosed. The method comprises self-evaluating a mesh capability and a gateway capability of the mesh node itself; searching for a nearby dynamic gateway node and determining whether the nearby dynamic gateway node is found; calculating cellular RF criteria and determining whether the cellular RF criteria are met when the nearby dynamic gateway node is found; and joining or re-joining the first micro-meshes when the cellular RF criteria are not met.

A SACM network is disclosed. The SACM comprises a service network, a plurality of mesh nodes and a plurality of dynamic gateway nodes. The service network is used for providing a wireless communication service. The plurality of mesh nodes is used for establishing a plurality of links between the mesh nodes, each of the links connecting two of the mesh nodes. Each of mesh nodes has a mesh node capability to communicate with the other mesh nodes as well as a gateway capability to provide an access to a service network. The plurality of dynamic gateway nodes are used for dynamically providing an access to the service network, wherein the dynamic gateway nodes are selected from the mesh nodes.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
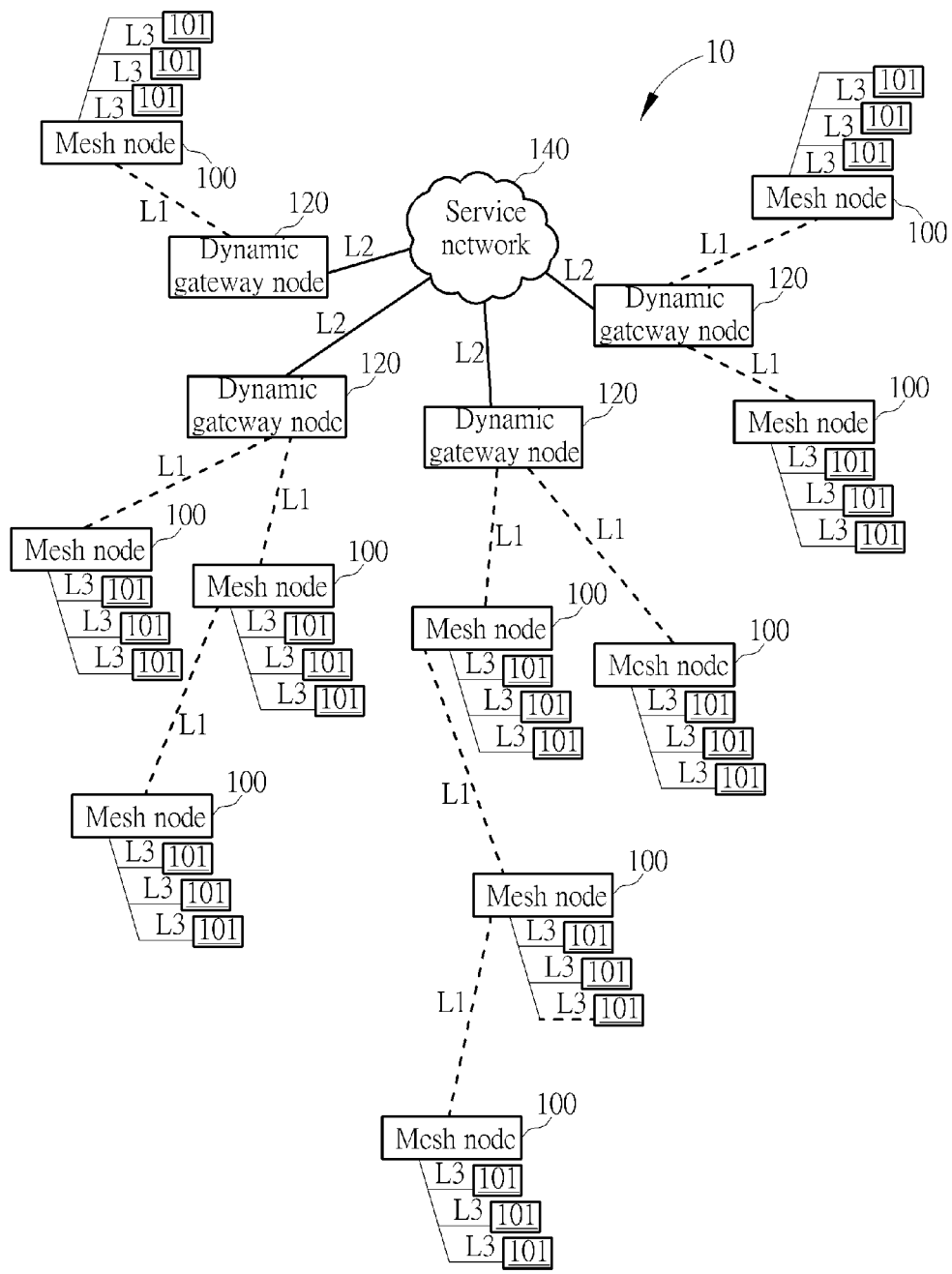
FIG. 1 is an infrastructure diagram of an exemplary SACM network.

Please refer to FIG. 1, which is an infrastructure diagram of an exemplary smart architecture cell mesh (SACM) network 10. As seen in FIG. 1, the SACM network 10 includes multiple mesh nodes 100, multiple electronic devices 101, multiple dynamic gateway nodes 120 and a service network 140. The service network 140 can be a cellular network, a satellite network or a wire line/fiber network, providing a wireless communication service (e.g. data transmission or voice transmission) or power line communication (PLC) or fiber. If the service network 140 is the cellular network, the service network 140 may include a radio access network (RAN) exploiting a radio access technology (RAT), such as Global System for Mobile Communication (GSM/2G), Universal Mobile Telecommunications System (UMTS/3G), or Long Term Evolved (LTE/4G) technology. The RAN in the service network 140 could be a GSM Edge Radio Access Network (GERAN) in the GSM technology, a UMTS Terrestrial Radio Access Network (UTRAN) in the WCDMA/HSPA technology, or an Evolved-UTRAN (E-UTRAN) in the LTE/LTE-Advanced technology.

The mesh nodes 100 may be used in surveillance systems, remote maintenance/control and metering. Each of the mesh nodes 100 is capable of performing communication with the other mesh nodes 100 and serving as a relay for the other mesh nodes 100 as well serve as one of the dynamic gateway nodes 120 providing an access to the service network 140. The mesh nodes 100 are configured for Machine-to-Machine (M2M) communication. Each of the mesh nodes 100 are connected with multiple electronic devices 101. The electronic devices 101 can be lights, pumps, valves, laptops, oven, heater, etc. The mesh node 100 establishes links L3 with multiple electronic devices 101, gathering data from the electronic devices for remote reporting. The links L3, preferably, complies with Zigbee, home plug or m-bus standard, which possess low cost and low power features.

The dynamic gateway nodes 120 allow the mesh nodes 100 to connect the service network 140 through various network access technology technologies, such as cellular technology, satellite communication technology or power line technology. In order to provide an access to the service network 140 for the all mesh nodes 100, the dynamic gateway nodes 120 may interface with different networks (e.g. mesh network and cellular network) using different protocols. The main feature of the dynamic gateway nodes 120 is that the dynamic gateway nodes are not dedicated nor fixed. The dynamic gateway nodes 120 are selected from the mesh nodes 100 according to computation and statistics and the dynamic gateway nodes 120 can be reselected and changed. Since there is no fixed, prohibitively expensive gateway concentrator node required, the cost of the SACM network 10 is relatively low.

Figure 2:
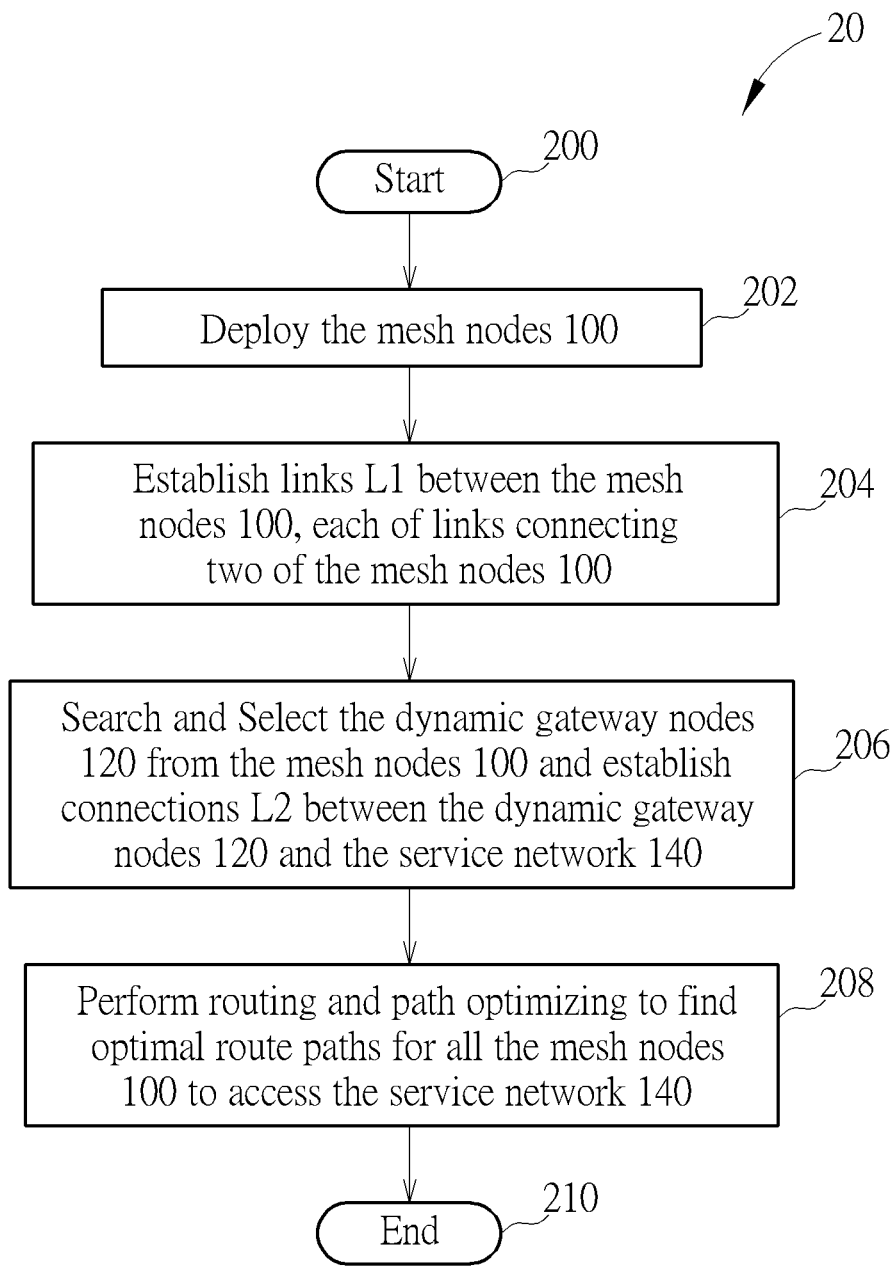
FIG. 2 is a flow chart of an exemplary process.

Please refer to FIG. 2, which is a flow chart of an exemplary process 20. The process 20 is used for establishing the SACM network 10 for M2M communication. The process 20 includes the following steps:

Step 200: Start.

Step 202: Deploy the mesh nodes 100.

Step 204: Establish links L1 between the mesh nodes 100, each of links connecting two of the mesh nodes 100.

Step 206: Search and Select the dynamic gateway nodes 120 from the mesh nodes 100 and establish connections L2 between the dynamic gateway nodes 120 and the service network 140.

Step 208: Perform routing and path optimizing to find optimal route paths for all the mesh nodes 100 to access the service network 140.

Step 210: End.

According to the process 20, the mesh nodes 100 are deployed. Each of mesh nodes 100 has a mesh node capability to communicate with the other mesh nodes 100 as well as a gateway capability to provide an access to the service network 140. After the mesh nodes 100 are deployed, the links L1 are established to connect every two mesh nodes 100. Preferably, the links L1 complies with a WIFI standard. Namely, the mesh nodes 100 communicate with each other via WIFI or WIFI alternate. The SACM network 10 may discover which mesh node is able to connect to the service network 140. Then, the SACM network 10 searches and selects the dynamic gateway nodes 120 from those mesh nodes 100. The dynamic gateway nodes 120 establish connections L2 with the service network 140 through various network access technologies, such as cellular technology (2G/3G/4G), satellite communication technology or power line technology. The dynamic gateway nodes 120 are selected according to cellular RF criteria. The cellular RF criteria indicate RF signal strength from a particular mesh node to the service network 140 (e.g. a cellular base station). The cellular RF criteria include at least one of Received Signal Strength Indicator (RSSI), Reference Signal Received Power (RSRP) and Reference Signal Received Quality (RSRQ), Channel Quality Indicator (CQI), Data throughput, and Modulation and Coding Scheme (MCS). According to the process 20, there is no dedicated dynamic gateway node assigned within the SACM network 10. In other words, all the mesh nodes 100 have the same opportunity to operate as the dynamic gateway nodes 120. After the connections L2 are established, the SACM network 10 performs routing and path optimizing to find the optimal route paths for all the mesh nodes 100 to access the service network 140. In this way, the SACM network 10 is formed itself with a little or no user intervention.

Figure 3:
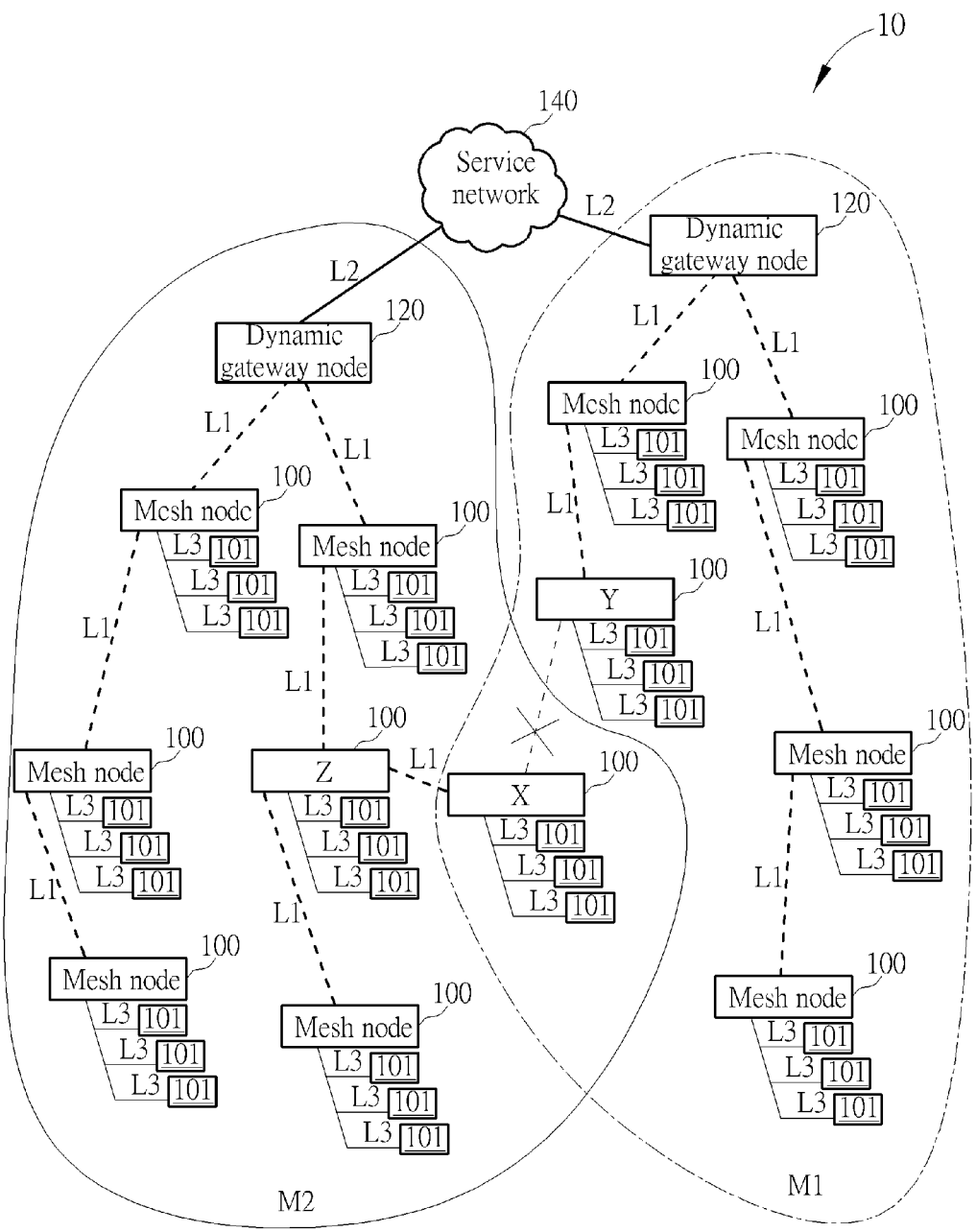
FIGS. 3-5 are infrastructure diagrams of exemplary SACM networks.

In addition, the SACM network 10 may segregate the mesh nodes 100 into different micro-meshes. At least one dynamic gateway node 120 exists in each micro-mesh, providing the access to the service network 140 for the other mesh nodes 100 in the micro-mesh. The SACM network 10 can increase or decrease the number of the mesh nodes 100 in each micro-mesh to perform load balancing by self-partitioning. Also, the mesh nodes 100 in the micro-meshes 10 may migrate from one micro-mesh to another micro-mesh to perform self-healing. For example, there are two micro-meshes M1 and M2 in the SACM network 10 as shown in FIG. 3. A mesh node X is in the coverage of the micro-mesh M1. When the mesh node X lost its connectivity with a mesh node Y in the micro-mesh M1, the mesh node X migrates from the micro-mesh M1 to the micro-mesh M2 and tries to connect with the a mesh node Z in the micro-mesh M2. Thus, the mesh modes X can get its connectivity back easily by joining other available micro-meshes. This makes the SACM network 10 resilient and robust.

Figure 4:
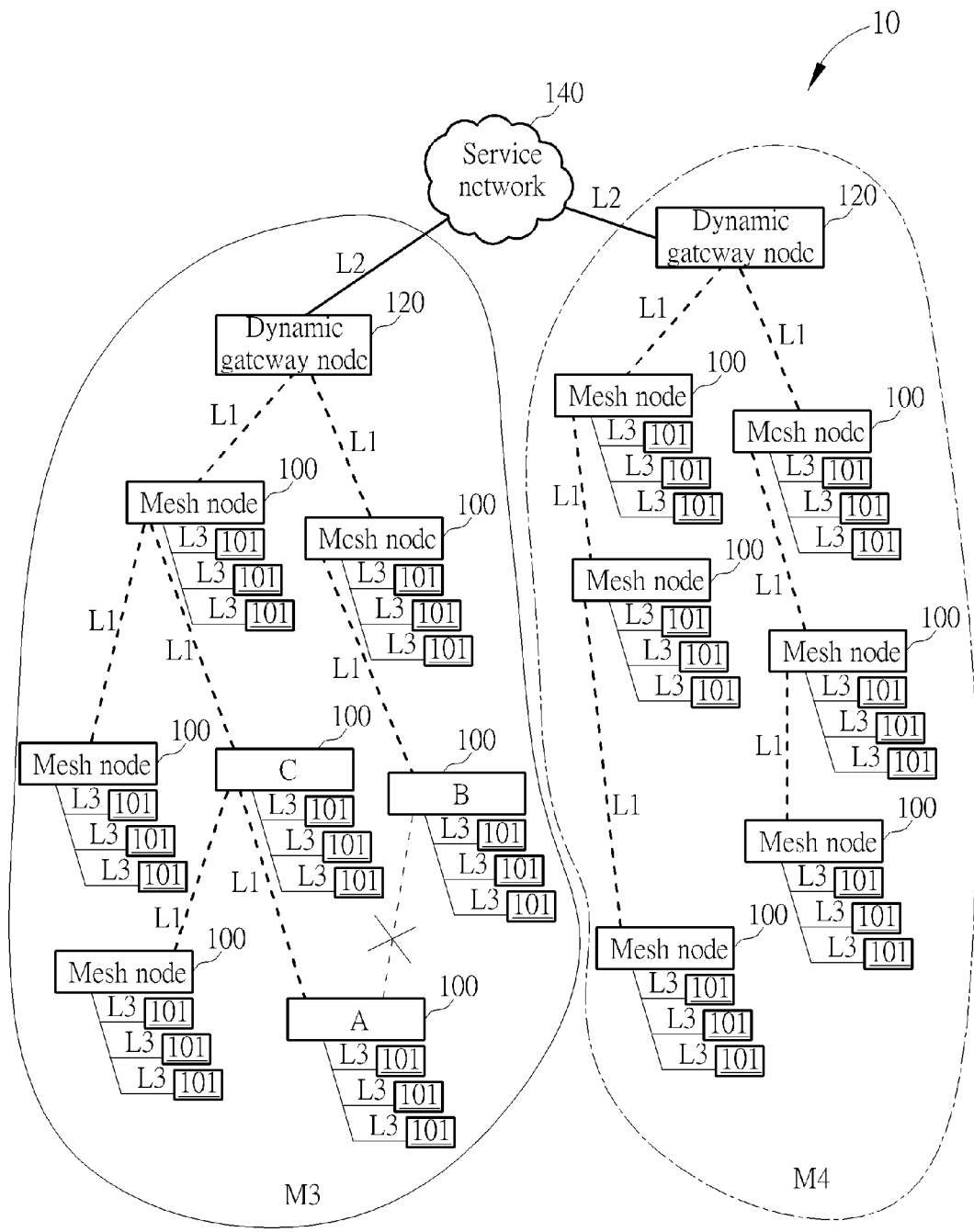
Figure 5:
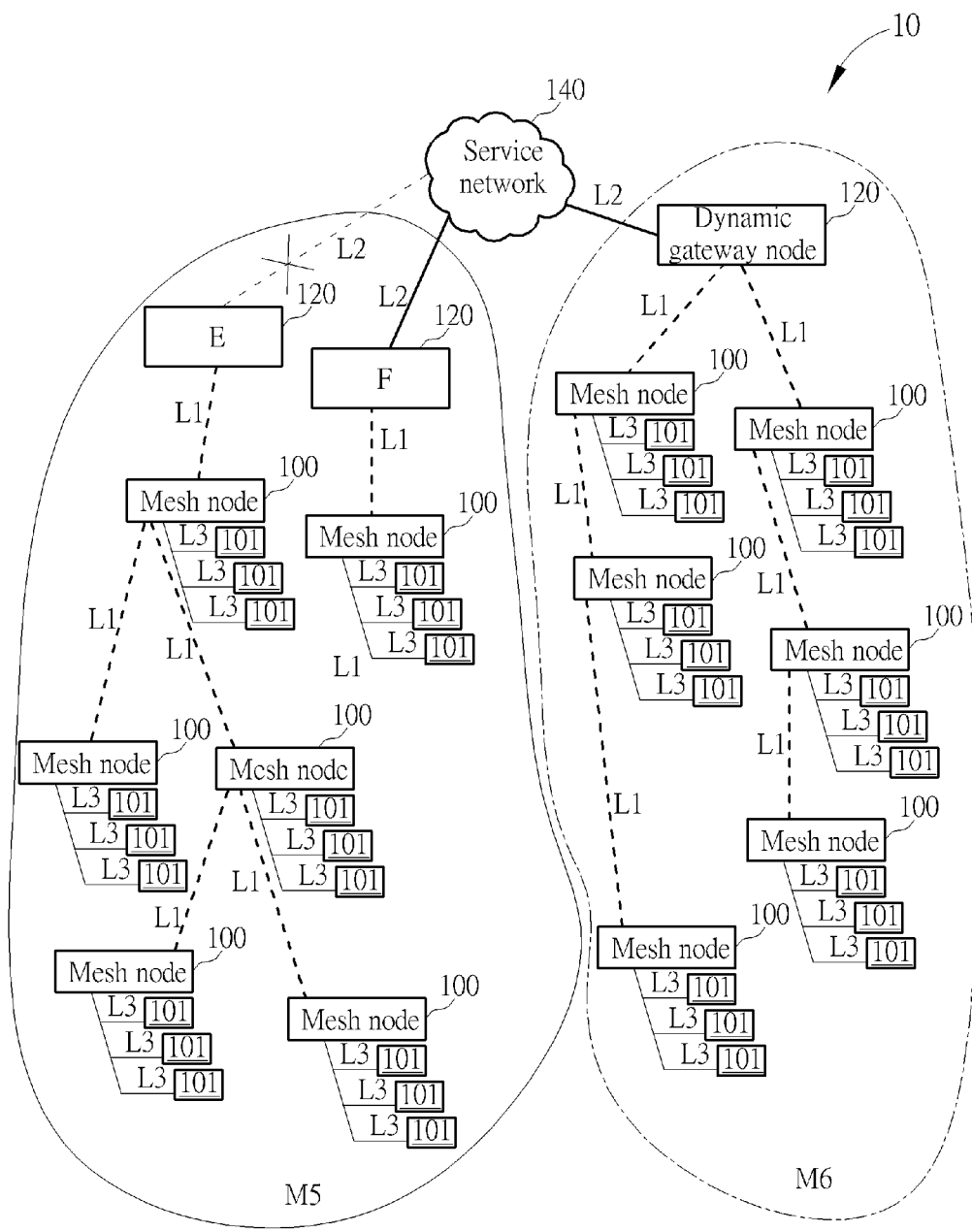

Moreover, the other self-healing may be performed in the SACM network 10, as shown in FIGS. 4 and 5. In FIG. 4, there are two micro-meshes M3 and M4 in the SACM network 10. When the link L1_1 between mesh nodes A and B in the micro-mesh M3 is broken or unstable (e.g. bad Quality of Service), the mesh node A tries to connect with another mesh node C in the micro-mesh M3 to establish a new link L1_2. Namely, the SACM network 10 re-routs the optimal path to the service network 140 when any of links L1 on the optimal path is broken or unstable.

Furthermore, the SACM network can reselect the dynamic gateway nodes 120 according to certain criteria in order to maintain the good connectivity with the service network 140. The dynamic gateway nodes 120 can change due to the certain criteria, which include at least one of network congestion, node connectivity failure, performance evaluation (e.g. better performance routing via another dynamic gateway node onto the service network 140) and micro-mesh osmosis (e.g. when one mesh node becomes back-haul "stranded", it requires the ability to dynamically merge with multiple adjacent micro-meshes to ensure connectivity stability). Please refer to FIG. 5, in which there are two micro-meshes M5 and M6 in the SACM network 10. When a dynamic gateway node E in the micro-mesh M5 lost the connectivity with the service network 140, the SACM network 10 re-select a new dynamic gateway node F from the other mesh nodes to replace the old dynamic gateway node E and get the connectivity back. Another feature of the SACM network 10 is that the SACM network 10 may monitor the status of the connections L2 (e.g. 2G/3G/4G links) and provides backup through mesh fail-over when disruption in the service network 140 occurs.

Figure 6:
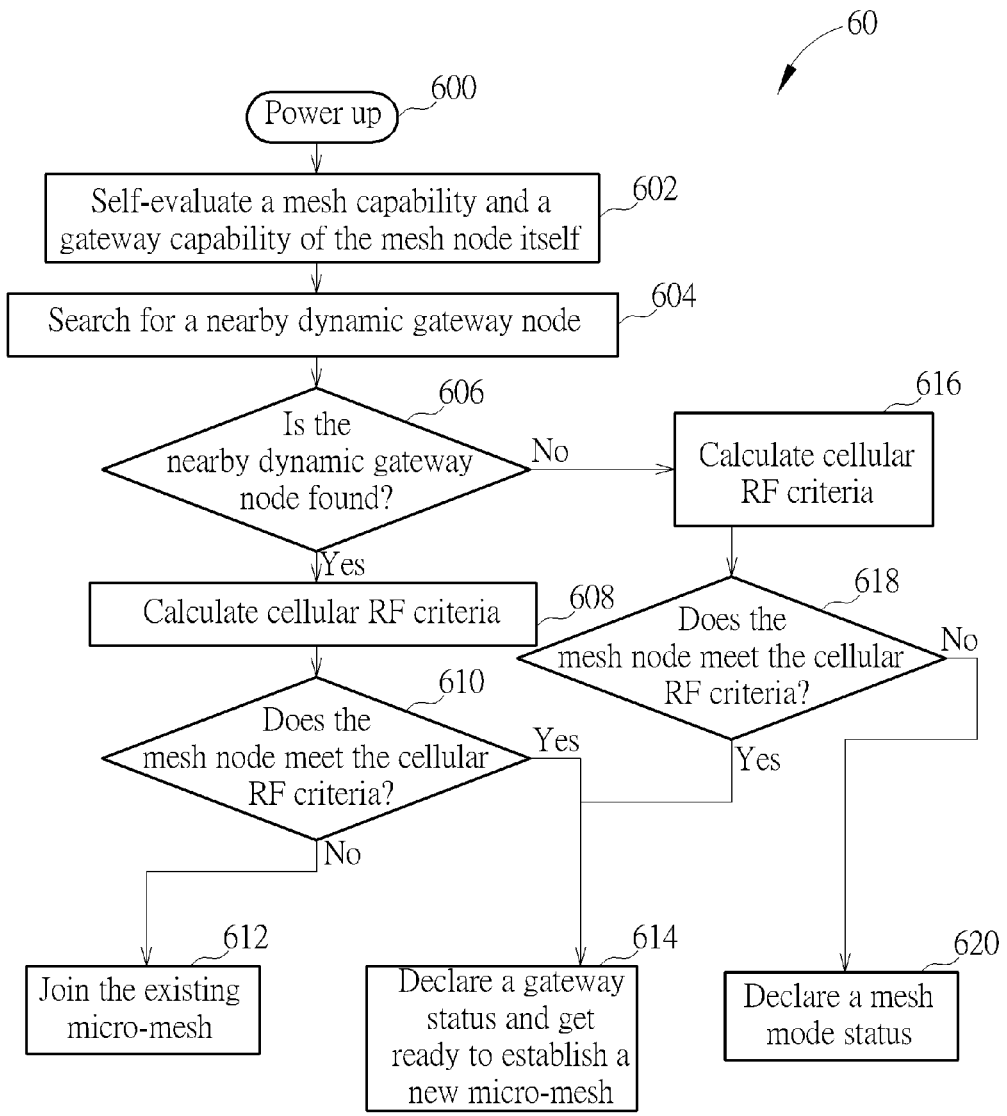
FIG. 6 is a flowchart of an exemplary process.

Please further refer to FIG. 6, which is a flowchart of an exemplary process 60. The process 60 is used for a mesh node to join a micro-mesh. The process 60 includes the following steps:

Step 600: Power up.

Step 602: Self-evaluate a mesh capability and a gateway capability of the mesh node itself.

Step 604: Search for a nearby dynamic gateway node.

Step 606: Is the nearby dynamic gateway node found? If yes, go to the Step 608; otherwise, go to the Step 616.

Step 608: Calculate cellular RF criteria.

Step 610: Does the mesh node meet the cellular RF criteria? If yes, go to the Step 614; otherwise, go to the Step 612.

Step 612: Join the existing micro-mesh.

Step 614: Declare a gateway status and get ready to establish a new micro-mesh.

Step 616: Calculate cellular RF criteria.

Step 618: Does the mesh node meet the cellular RF criteria? If yes, go to the Step 614; otherwise, go to the Step 620.

Step 620: Declare a mesh mode status.

According to the process 60, the mesh node self-evaluates the mesh capability and the gateway capability of the mesh node itself. Then, the mesh node searches for the nearby dynamic gateway node and determines whether the nearby dynamic gateway node is found. If the nearby dynamic gateway node is found the mesh node calculates cellular RF criteria. The cellular RF criteria indicate RF signal strength from a particular mesh node to a service network (e.g. a cellular base station). The cellular RF signal criteria include at least one of RSSI, RSRP and RSRQ, Data throughput, and MCS. The mesh node determines whether the cellular RF criteria are met. If the cellular RF criteria are met, the mesh node joins the existing micro-meshes. If the cellular RF criteria are not met, the mesh node declares a gateway status and getting ready to establish a second micro-mesh.

Figure 7:
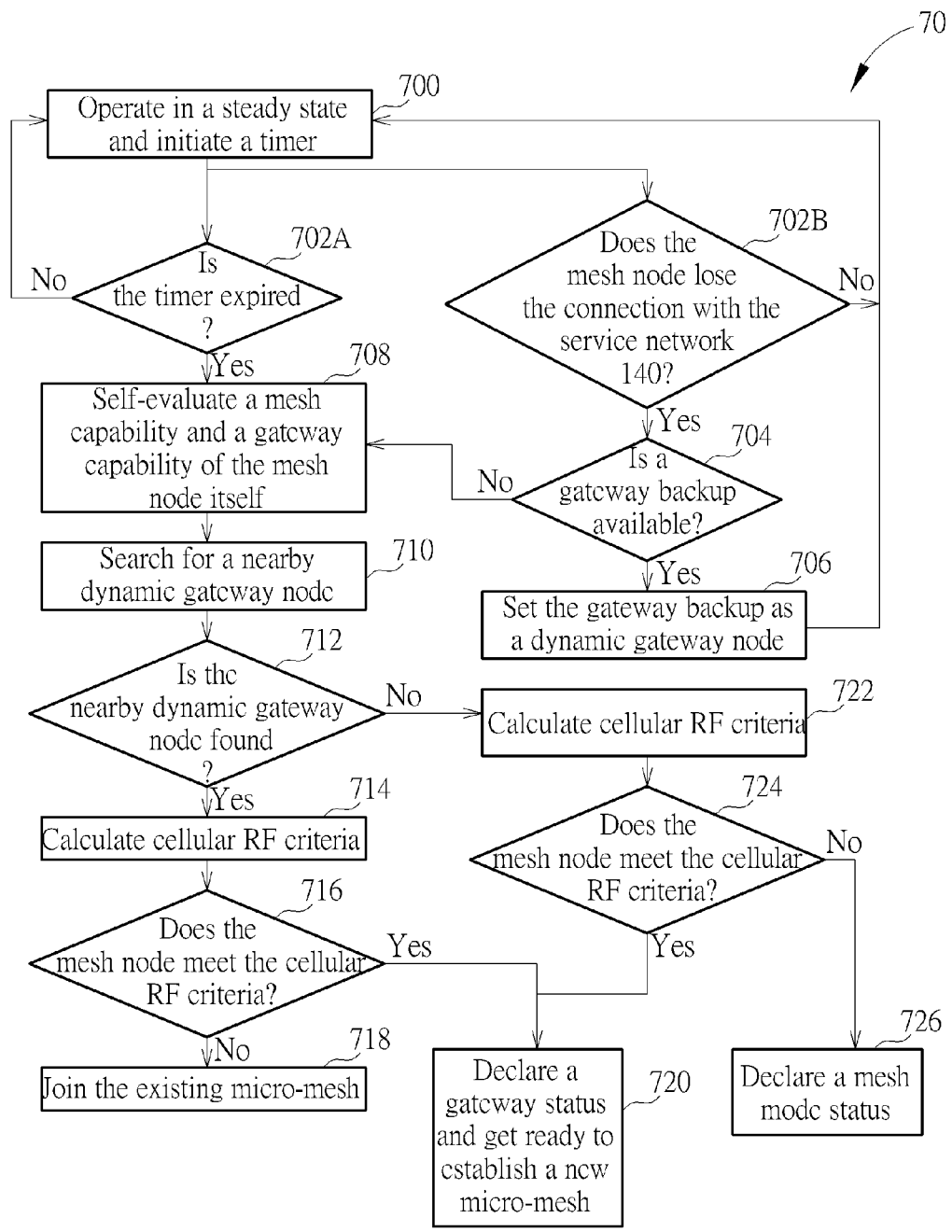
FIG. 7 is a flowchart of exemplary processes.
Figure 8:
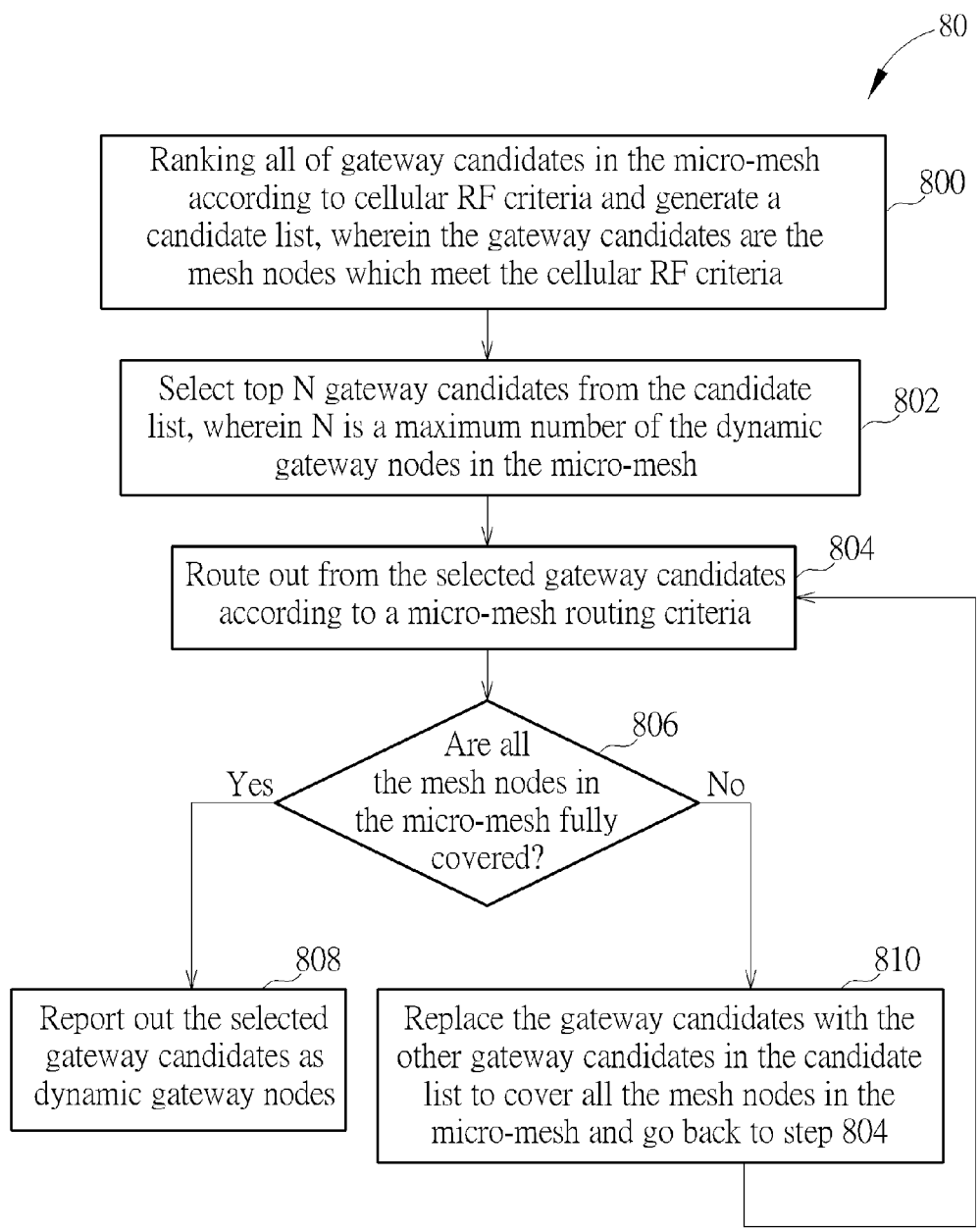
FIG. 8 is a flowchart of an exemplary process.

In addition, when a mesh node attempts to rejoin a micro-mesh, the process 60 can be modified, as shown in FIG. 7. FIG. 7 is a flowchart of an exemplary process 70. The process 70 can be used for a mesh node to rejoin a micro-mesh. The process 70 includes the following steps:

Step 700: Operate in a steady state and initiate a timer.

Step 702A: Is the timer expired? If yes, go to the step 708; otherwise, go back to the step 700.

Step 702B: Does the mesh node lose the connection with the service network 140? If yes, go to the step 704; otherwise, go back to the step 700.

Step 704: Is a gateway backup available? If yes, go to the step 706; otherwise, go to the step 708.

Step 706: Set the gateway backup as a dynamic gateway node.

Step 708: Self-evaluate a mesh capability and a gateway capability of the mesh node itself.

Step 710: Search for a nearby dynamic gateway node.

Step 712: Is the nearby dynamic gateway node found? If yes, go to the Step 714; otherwise, go to the Step 716.

Step 714: Calculate cellular RF criteria.

Step 716: Does the mesh node meet the cellular RF criteria? If yes, go to the Step 720; otherwise, go to the Step 718.

Step 718: Join the existing micro-mesh.

Step 720: Declare a gateway status and get ready to establish a new micro-mesh.

Step 722: Calculate cellular RF criteria.

Step 724: Does the mesh node meet the cellular RF criteria? If yes, go to the Step 720; otherwise, go to the Step 726.

Step 726: Declare a mesh mode status.

According to the process 70, the mesh node initially operates in the steady state and initiates the timer. The mesh node determines whether the timer expires or loses the connection with a service network (e.g. the service network 140). If the timer is expired, the mesh node executes the steps 708~726; otherwise, go back to the steady state. If the connection with the service network 140 is lost, the mesh node determines whether the gateway backup is available. If the gateway back is available, the mesh node sets the gateway backup as a dynamic gateway node; otherwise, the mesh node executes the steps 708~726. In addition, the mesh node can determine whether the connection with the service network 140 is lost according to a lost_GW flag or a GW_reset flag. If the lost_GW flag or the GW_reset flag is true, it means that the mesh node loses the connection with the service network.

Regarding searching and selecting dynamic gateway node(s) in a micro-mesh, a process 80 can be applied to search and select dynamic gateway nodes in a micro-mesh. The process 80 includes the following steps:

Step 800: Ranking all of gateway candidates in the micro-mesh according to cellular RF criteria and generate a candidate list, wherein the gateway candidates are the mesh nodes which meet the cellular RF criteria.

Step 802: Select top N gateway candidates from the candidate list, wherein N is a maximum number of the dynamic gateway nodes in the micro-mesh.

Step 804: Rout out from the selected gateway candidates according to a micro-mesh routing criteria.

Step 806: Are all the mesh nodes in the micro-mesh fully covered? If yes, go the step 808; otherwise, go the step 810.

Step 808: Report out the selected gateway candidates as dynamic gateway nodes.

Step 810: Replace the gateway candidates with the other gateway candidates in the candidate list to cover all the mesh nodes in the micro-mesh and go back to step 804.

According to the process 80, all the gateway candidates in the micro-mesh are ranked according to the cellular RF criteria. The cellular RF criteria indicate RF signal strength from a particular mesh node to a service network (e.g. a cellular base station). The cellular RF signal criteria include at least one of RSSI, RSRP and RSRQ, CQI, Data throughput, and MCS. The top N gateway candidates are selected from the candidate list. N is a programmable parameter which represents the maximum number of the dynamic gateway nodes in the micro-mesh. The routing according to the micro-mesh routing criteria is performed on the selected N gateway candidates to cover the all mesh nodes in the micro-mesh. If the all the mesh nodes in the micro-mesh are fully covered, the selected N gateway candidates are reported as dynamic gateway nodes in the micro-mesh. If the all the mesh nodes are not fully covered, the other gateway candidates in the candidate list capable of covering all the mesh nodes are selected to replace the originally selected gateway candidates.

Figure 9:
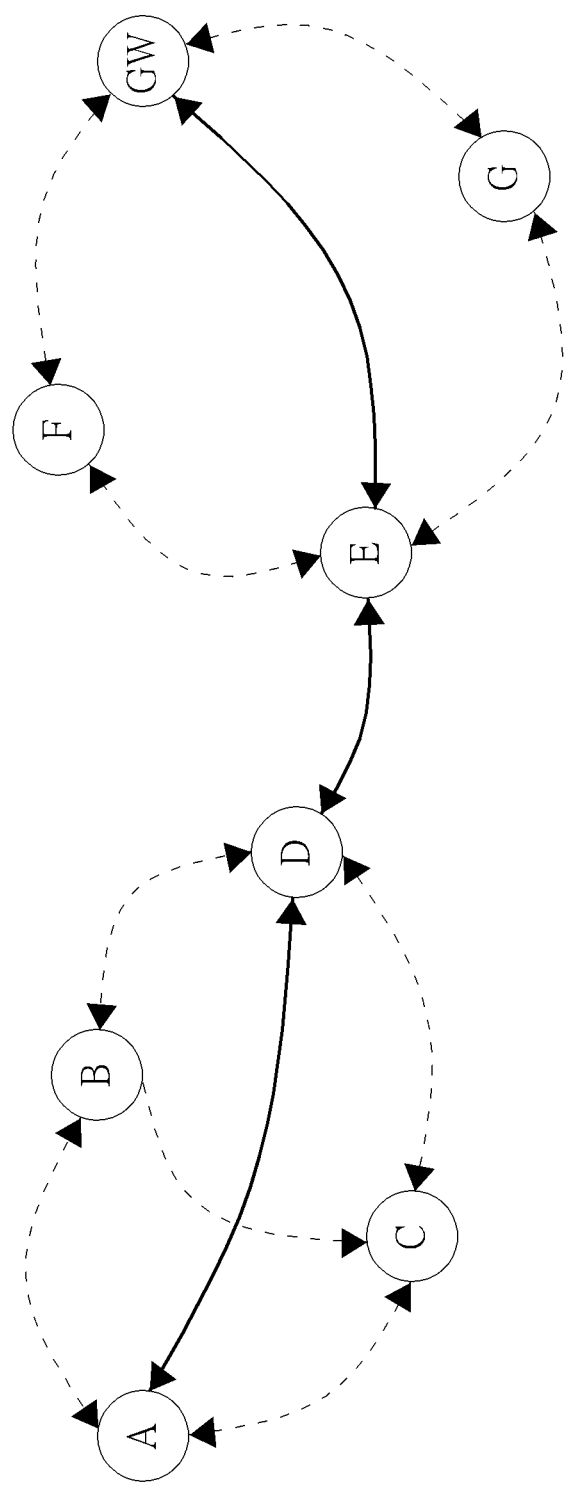
FIG. 9 is a schematic diagram of a performance-based routing.

The micro-mesh routing criteria above can include at least one of searching for a micro-mesh route which has least mesh nodes from an end mesh node to the service network (i.e. less hops), a micro-mesh route which has the best micro-mesh RF signal and a micro-mesh route which has the best micro-mesh data rate. Please refer to FIG. 9, which is a schematic diagram of a performance-based routing. In FIG. 9, Node A has visibility to Node B, C and D. To get to the dynamic gateway node (GW), node A has the following routes: A, B, D, E, F, GW or A, C, D, E, G, GW or A, D, E, GW, etc. However, after applying the Performance route constraint, only route A, D, E, GW will be selected as it meets the fastest, and less than 4 hops criteria.

An example of implementation of the process 80 is briefly stated as follows. There are 35 mesh nodes in a micro-mesh M3. The micro-mesh M3 has a programmable parameter Max_nodes set to 40, which is the maximum number of the mesh nodes within the micro-mesh M3. Among the 35 mesh nodes in the micro-mesh M3, 30 mesh nodes meet the cellular RF criteria including at least one of RSSI, RSRP, RSRQ, CQI, Data throughput, MCS. The 30 mesh nodes are denoted as gateway candidates. The gateway candidates are ranked according to the cellular RF criteria such that a candidate list L is generated. The maximum number of the dynamic gateway node in the micro-mesh M3 is set to 2. The top 2 gateway candidates G1, G2 (the two gateway candidates with the best cellular signal strength) are selected from the candidate list L and reported as the dynamic gateway nodes in the micro-mesh M3. If the routes starting from the selected gateway candidates G1, G2 cover all the mesh nodes in the micro-mesh M3, the selected gateway candidates G1 and G2 are reported. The routes starting from the selected gateway candidates G1 and G2 are calculated according to the micro-mesh routing criteria. If the routes starting from the selected gateway candidates G1 and G2 do not cover all the mesh nodes in the micro-mesh M3, the other gateway candidates in the candidate list L will be select to replace to the selected gateway candidates G1 and G2.

Then, the routes starting from the new gateway candidates are recalculated and the following steps are repeated.

In the exemplary implementation of the instant disclosure, several parameters should be taken into consideration. The parameters includes a maximum number of hops, a node RSSI, a node data throughput(TP), a route path, the best route path, the best route, the next best route, a prefer route, a select route, but not limited herein. The maximum number of hops=0, 1, 2, . . . H, where H is a programmable number. The node RSSI is denoted as RSSI measured from the target mesh node to the next reachable node. The node Data TP is denoted as data throughput measured at each route from the target mesh node. The route path is denoted as nodes tracing from the end mesh node to the dynamic gateway node. The best route is denoted as the most optimized route based on the micro-mesh routing criteria. The next best route is denoted as an alternate route after the best route for a backup. The prefer route is denoted as a route set by a network/operator. The select route is denoted as a route used in a mesh network. In normal operation, the select route is identical to the best route. Unless, when the prefer route is enable, the select route is identical to the prefer route.

In brief, the SACM network 10 can perform mesh failover to guarantee overall performance and ensure longevity and capability of the cellular mesh architecture, whilst enabling the mobile network operator flexibility towards network technology "upgrades" without affecting the existing service provision on established cellular IP standard such as 2G/3G/LTE. The dynamic automated "fail over" routing is an essential requirement of the SACM network 10. This capability will enable a resilience that is presently unobtainable with "best endeavour" mobile communication networks. The service network 140 is the natural choice to enable backbone communication connectivity for the "explosive" M2M market, simply because the network infrastructure and capacity is already in-situ.

Regarding the security, the SACM network 10 may exchange cryptographic keys between the mesh nodes to perform end-to-end security. The security is embedded within crypto algorithms and hardware. There are various levels of security that can be dynamically assigned by application or usage type:

(1) Consumer

Application management for consumer procured services such as home automation, content on demand, demand response management to name but a few. This environment will have to accommodate a "push and pull" security authentication solution that is dependent upon the consumer.

(2) Commercial

Commercially led services such as building/home security, banking, credential management, legal services-all, which require a degree of authentication to ensure a suitable operating environment. All security and packet data will be responsibly managed by the services provision company and not the responsibility of the network.

(3) Government

Citizenship initiatives that can be fulfilled over a dedicated, resilient Critical Network Infrastructure (CNI), "always on" network that is available to all. Suggested applications range from eHealth, through to voting and policing. Security by design is now the responsibility of the network and the authorized agents delivering the citizenship initiatives. Advice, accreditation and authorization of appropriate applications and technology will be within the remit of the network provider.

(4) Sensitive

Public safety initiatives. Fully resilient security process and technologies deployed throughout the network and the responsibility of the agencies, whilst utilizing the communications network through a back-to-back policy agreement.

Figure 10:
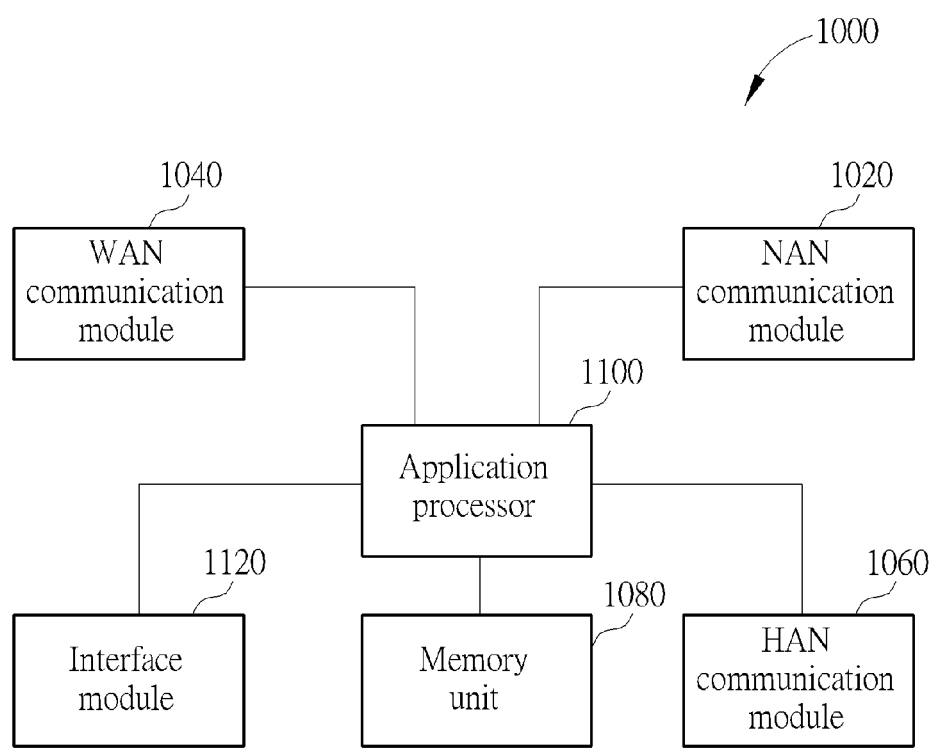
FIG. 10 is a schematic diagram of a communication device.

FIG. 10 illustrates a schematic diagram of an exemplary communication device 1000. The communication device 1000 may be implementation of the mesh nodes 100 in FIG. 1. The communication device 1000 includes a neighborhood area network communication (NAN) module 1020, a wide area network communication (WAN) module 1040, a home area network communication (HAN) module 1060, a memory unit 1080, an application processor module 1100 and an interface module 1120. The NAN communication module 1020 is used for establishing the links L1 with neighboring mesh nodes. The NAN communication module 1020 provides a means to communicate, a resilient link from communication device 1000 to communication device 1000, from house to house, etc. The WAN communication module 1040 is used for establishing the connections L2 with the service network 140. The WAN communication module 1040 provides an access link from the communication device 1000 back to a central server/service provider server (e.g. the service network 140 in FIG. 1). The WAN communication module 1040 can comprise of any long range, network access technology such as the popular 2G/3G/4G cellular or a Power Line Communication (PLC) or Satellite communication module (SatCom). It provides an Ingress gateway for the SACM network 10. The HAN communication module 1060 is used for establishing the links L3 with the electronic devices 101 which are resided in a home or within a short distance from the location of the communication device 1000 and being allowed to communicate with the communication device 1000. The memory unit 1080 is used for storing cryptographic keys and a program code corresponding to the process 20. Examples of the memory unit 1080 include but are not limited to a flash memory, and random-access memory (RAM). The application processor module 1100 is coupled to the WAN communication module 1040, NAN communication module 1020, HAN communication module 1060 and memory unit 1080 and used for managing the WAN communication module 1040, NAN communication 1020 module and HAN communication 1080 module and processing the program code to execute the process 20. The interface module 1120 comprises of all standard interface ports such as RS232, USB, Ethernet, etc. In some examples, the communication device 1000 interfaces with a smart meter to read and collect its data via a NAN interface then pass them back to the service network 140 via the WAN communication module 1040. The communication device 1000 also manages and controls the smart meter to perform select function such as Activation, provisioning, firmware upgrade, etc. The communication device 1000 also interfaces with other devices via its HAN communication module 1060 such as an In Home Display (IHD), to provide visual information to the homeowner.

Furthermore, the aforementioned steps of the process 20 including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the communication device 1000.

To sum up, a robust and resilient network is establish according to examples of the present disclosure. The mesh nodes of the present disclosure are cable of serving as a dynamic gateway, providing an access to the service network. Therefore, there will be no fixed, prohibitively expensive gateway concentrator node required according to the present disclosure. The present disclosure provides a more dynamic, cheaper and smarter mesh network infrastructure. Compared to the prior art, the SACM network of the present disclosure has several advantages, such as gateway assignation, resilient and robust communications network, security by design, dynamic and performance routing high bandwidth and throughput.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of establishing a smart architecture cell mesh (SACM) network, the method comprising:
   deploying a plurality of mesh nodes, wherein each of mesh nodes having a mesh node capability to communicate with the other mesh nodes as well as a gateway capability to provide an access to a service network, wherein the service network provides a wireless communication service;
   establishing a plurality of links between the mesh nodes, each of the links connecting two of the mesh nodes;
   searching and selecting a plurality of dynamic gateway nodes from the plurality of the mesh nodes and establishing a plurality of connections between the dynamic gateway nodes and the service network; and
   performing routing and path optimizing to find optimal route paths for all the mesh nodes to access the service network;
   wherein searching and selecting the plurality of dynamic gateway nodes from the plurality of the mesh nodes comprises searching and selecting at least one dynamic gateway nodes in a first micro-mesh;
   wherein searching and selecting the-at least one dynamic gateway nodes in the first micro-mesh of the micro-meshes comprises:
      ranking all of gateway candidates in the first micro-mesh according to cellular RF criteria and generating a ranking result, wherein the gateway candidates are mesh nodes in the first micro-mesh meet the cellular RF criteria;
      selecting top N gateway candidates according to the ranking result, wherein N is a maximum number of the dynamic gateway nodes in the first micro-mesh;
      routing out from the selected N gateway candidates according to a micro-mesh routing criteria;
      determining whether all the mesh nodes in the first micro-mesh are fully covered; and
      reporting out the selected N gateway candidates as dynamic gateway nodes in the first micro-mesh.

2. The method of claim 1 further comprising segregating the mesh nodes into a plurality of micro-meshes.

3. The method of claim 1 further comprising performing self-healing, and load balancing.

4. The method of claim 3, wherein performing load balancing comprise: performing self-partitioning on the plurality of micro-meshes.

5. The method of claim 3, wherein performing self-healing comprises at least one of:
   dynamically re-selecting the dynamic gateway nodes according to reselection criteria;
   re-routing the optimal route paths to the service network when any of the links on the optimal paths is broken or unstable; and
   performing node migration on the mesh nodes from a first micro-mesh to a second micro-mesh.

6. The method of claim 5, wherein the reselection criteria comprises at least one of a network congestion, node connectivity failure, performance evaluation and micro-mesh osmosis.

7. The method of claim 1 further comprising monitoring a status of the connections with the service network and providing a gateway backup through mesh fail-over when disruption in the service network occurs.

8. The method of claim 1 further comprising linking the mesh nodes and a plurality of electronic devices.

9. The method of claim 1, wherein the mesh nodes are configured to Machine-to-Machine (M2M) communication.

10. The method of claim 1 further comprising exchanging cryptographic keys between the mesh nodes to perform end-to-end security.

11. The method of claim 1, wherein the service network is a cellular network, satellite network or wire line/fiber network.

12. The method of claim 1, wherein the cellular RF signal criteria comprises at least one of Received Signal Strength Indicator (RSSI), Reference Signal Received Power (RSRP) and Reference Signal Received Quality (RSRQ), Channel Quality Indicator (CQI), Data throughput, Modulation and Coding Scheme (MCS).

13. The method of claim 1, further comprising: replacing the selected gateway candidates with the other gateway candidates according to the ranking result to cover all the mesh nodes in the first micro-mesh.

14. The method of claim 1, wherein the micro-mesh routing criteria comprises at least one of:
   a micro-mesh route which has least mesh nodes from an end mesh node to the service network;
   a micro-mesh route which has a best micro-mesh RF signal; and
   a micro-mesh route which has a best micro-mesh data rate.

15. A smart architecture cell mesh (SACM) network comprising:
   a service network for providing a wireless communication service;
   a plurality of mesh nodes for establishing a plurality of links between the mesh nodes, each of the links connecting two of the mesh nodes, each of mesh nodes having a mesh node capability to communicate with the other mesh nodes as well as a gateway capability to provide an access to a service network; and
   a plurality of dynamic gateway nodes for dynamically providing an access to the service network, wherein the dynamic gateway nodes are selected from the mesh nodes;
   wherein each of the mesh nodes comprises:
      a neighborhood area network communication (NAN) module for linking with neighboring mesh nodes;
      a wide area network communication (WAN) module for connecting with the service network;
      a home area network communication (HAN) module for linking with electronic devices;
      a memory unit for storing cryptographic keys and a program code corresponding to a process; and
      an application processor module coupled to the WAN module, NAN module, HAN module and memory unit, for managing the WAN module, NAN module and HAN module and processing the program code to execute the process.

16. The SACM network of claim 15, wherein the mesh nodes are segregated to form a plurality of micro-meshes.

17. The SACM network of claim 15, wherein the service network is a cellular network, satellite network or wire line/fiber network.

18. The SACM network of claim 15, wherein the mesh nodes are configured for Machine-to-Machine (M2M) communication.

19. The SACM network of claim 15, wherein the mesh nodes are further used for searching and selecting the dynamic gateway nodes.

20. The SACM network of claim 15, wherein the mesh nodes, the dynamic gateway nodes and the service network are further used for cooperating to perform routing and path optimizing to find optimal route paths for all the mesh nodes to access the service network.

21. The SACM network of claim 16, wherein the mesh nodes are further used for performing self-healing, and load balancing.

22. The SACM network of claim 21, wherein performing load balancing comprise:
   performing self-partitioning on the micro-meshes.

23. The SACM network of claim 21, wherein performing self-healing comprises at least one of:
   dynamically re-selecting the dynamic gateway nodes according to reselection criteria;
   re-routing the optimal route paths to the service network when any of the links on the optimal paths is broken or unstable; and
   performing node migration on the mesh nodes from a first micro-mesh of the micro-meshes to a second micro-mesh of the micro-meshes.

24. The SACM network of claim 23, wherein the reselection criteria comprise at least one of network congestion, node connectivity failure, performance evaluation and micro-mesh osmosis.

25. The SACM network of claim 15, wherein the process further comprises: monitoring a status of the connections with the service network and providing a gateway backup through mesh fail-over when disruption in the service network occurs.

26. The SACM network of claim 15, wherein the process further comprises: exchanging cryptographic keys to perform end-to-end security.

27. The SACM network of claim 19, wherein searching and selecting the plurality of dynamic gateway nodes from the mesh nodes comprises searching and selecting at least one dynamic gateway nodes in a first micro-mesh.

28. The SACM network of claim 27, wherein searching and selecting the at least one dynamic gateway nodes in the first micro-mesh of the micro-meshes comprises:
   ranking all of gateway candidates in the first micro-mesh according to cellular RF criteria and generating a ranking result, wherein the gateway candidates are mesh nodes in the first micro-mesh meet the cellular RF criteria;
   selecting top N gateway candidates according to the ranking result, wherein N is a maximum number of the dynamic gateway nodes in the first micro-mesh;
   routing out from the selected N gateway candidates according to a micro-mesh routing criteria;
   determining whether all the mesh nodes in the first micro-mesh are fully covered; and
   reporting out the selected N gateway candidates as dynamic gateway nodes in the first micro-mesh.

29. The SACM network of claim 28, wherein the cellular RF signal criteria comprises at least one of Received Signal Strength Indicator (RSSI), Reference Signal Received Power (RSRP) and Reference Signal Received Quality (RSRQ), Channel Quality Indicator (CQI), Data throughput, Modulation and Coding Scheme (MCS).

30. The SACM network of claim 27 further comprising replacing the selected N gateway candidates with the other gateway candidates according to the ranking result to cover all the mesh nodes in the first micro-mesh.

31. The SACM network of claim 28, wherein the micro-mesh routing criteria comprises at least one of:
a micro-mesh route which has least mesh nodes from an end mesh node to the service network;
a micro-mesh route which has a best micro-mesh RF signal; and
a micro-mesh route which has a best micro-mesh data rate.

32. The SACM network of claim 28, wherein each of mesh nodes is further used for:
self-evaluating a mesh capability and a gateway capability itself;
searching for a nearby dynamic gateway node and determining whether the nearby dynamic gateway node is found;
calculating cellular RF criteria and determining whether the cellular RF criteria are met when the nearby dynamic gateway node is found; and
joining or re-joining a first micro-meshes when the cellular RF criteria are not met.

33. The SACM network of claim 32 further comprising declaring a gateway status and getting ready to establish a second micro-mesh when the cellular RF criteria are met.

34. The SACM network of claim 32 further comprising:
calculating a gateway selection criteria and determining whether the cellular RF criteria are met when the nearby dynamic gateway node is not found; and
declaring a gateway status and getting ready to establish a second micro-mesh when the cellular RF criteria are met.

35. The SACM network of claim 34 further comprising:
declaring a mesh mode status when the cellular RF criteria are not met.

36. The SACM network of claim 32, wherein self-evaluating the mesh capability and the gateway capability is performed when the mesh node powers up or when a timer expires or when a gateway backup is not available, wherein the gateway backup is another dynamic gateway node in the first micro-mesh.

* * * * *